United States Patent
Gryspeerdt

(10) Patent No.: US 7,260,967 B2
(45) Date of Patent: Aug. 28, 2007

(54) ELEVATOR SLATS FOR AN AGRICULTURAL HARVESTING MACHINE

(75) Inventor: José G. T. Gryspeerdt, Nevele (BE)

(73) Assignee: CNH America LLC, Racine, WI (US)

( * ) Notice: Subject to any disclaimer, the term of this patent is extended or adjusted under 35 U.S.C. 154(b) by 274 days.

(21) Appl. No.: 11/071,497

(22) Filed: Mar. 3, 2005

(65) Prior Publication Data

US 2005/0172592 A1    Aug. 11, 2005

Related U.S. Application Data

(62) Division of application No. 10/476,273, filed on Oct. 27, 2003, now Pat. No. 6,922,983.

(51) Int. Cl.
*B21D 5/08* (2006.01)
*B21K 19/08* (2006.01)

(52) U.S. Cl. ................ 72/129; 72/177; 29/891.1

(58) Field of Classification Search .......... 72/177, 72/181, 180, 182, 129; 29/891, 891.1
See application file for complete search history.

(56) References Cited

U.S. PATENT DOCUMENTS

| | | | |
|---|---|---|---|
| 2,251,967 A | * | 8/1941 | Yoder ........................... 72/124 |
| 2,471,490 A | * | 5/1949 | Mercer ......................... 72/178 |
| 2,687,209 A | * | 8/1954 | Rost et al. ................. 198/690.2 |
| 3,456,471 A | * | 7/1969 | Ellis ............................. 72/177 |
| 3,630,059 A | * | 12/1971 | Henkel ......................... 72/177 |
| 3,967,719 A | | 7/1976 | Kloefkorn et al. |
| 5,086,699 A | * | 2/1992 | Philpot ..................... 101/415.1 |
| 5,346,429 A | | 9/1994 | Farley |
| 5,478,277 A | | 12/1995 | Kloefkorn |
| 5,976,013 A | | 11/1999 | Hamann |

FOREIGN PATENT DOCUMENTS

| DE | 3231771 | 3/1984 |
|---|---|---|
| DE | 4132246 | 4/1993 |
| JP | 07264919 | 10/1995 |

* cited by examiner

*Primary Examiner*—Daniel C Crane
(74) *Attorney, Agent, or Firm*—Rebecca Henkel

(57) ABSTRACT

An agricultural harvesting machine that comprises a crop processing mechanism and an elevator assembly for conveying harvested crop material to the crop processing mechanism is provided. The elevator assembly comprises an elevator housing, an elevator mechanism mounted in the housing, at least two flexible endless members and a plurality of slats mounted transversely to the flexible members. The slats have an S-shaped cross section that provides additional strength to the slats while reducing the chance of damage to the crop conveyed by these slats.

4 Claims, 4 Drawing Sheets

ELEVATOR SLATS FOR AN AGRICULTURAL HARVESTING MACHINE

CROSS REFERENCE TO RELATED APPLICATIONS

This patent application is a Divisional of, and claims priority to under 35 U.S.C. §120, U.S. patent application Ser. No. 10/476,273, filed on Oct. 27, 2003, now U.S. Pat. No. 6,922,983, entitled, "Elevator Slats For An Agricultural Harvesting Machine" and having Jose G. T. Gryspeerdt as the Inventor. The full disclosure of U.S. patent application Ser. No. 10/476,273 is hereby fully incorporated by reference.

FIELD OF INVENTION

The present invention relates to an elevator for an agricultural harvesting machine which is equipped for collecting crop material from a field and processing the same. In particular, it relates to the elevator which conveys the collected crop to the crop processing mechanism and slats used in such elevator.

BACKGROUND OF INVENTION

Agricultural harvesting machines such as combine harvesters generally are developed to handle a large variety of crops. For example a combine harvester may be used to harvest small grain crops such as wheat and rye, rape or grass seed or large grain crops such as peas or corn. In this manner the use of the harvester, which is a high investment tool, can be extended over a longer season.

Conventionally the harvester is equipped with a detachable crop collecting attachment, such as a grain or corn header, which cuts the stems of the crop standing in the field and conveys the same to the inlet of an elevator housing. Alternatively crop which has been cut previously can be lifted up from the field by a pick-up attachment and conveyed to the same inlet. Elevator mechanism, commonly a chain elevator with transverse slats, grab the collected crop deposited in front of the inlet and convey it rearwardly and upwardly towards the crop processing mechanism, conventionally a threshing drum and concave or grate assembly.

The transverse slats of the elevator can be made out of angled steel profiles. However, because of the increasing capacity of modern harvesters, these slats are subject to increasing loads which may result in a permanent deformation of the slats. To increase their strength, the slats may be made out of more complicated profiles such as a U- or V-shaped profile as shown in U.S. Pat. Nos. 4,369,617 and 5,346,429. However it has been experienced that near the outlet of the elevator the trailing edge of the slats may notch the corn grains in the ears, thereby seriously reducing their capacity for storage. Hence there is a need for a sturdy slat which does not damage the kernels.

SUMMARY OF INVENTION

According to one aspect of the present invention there is provided an agricultural harvesting machine comprising crop processing mechanism and an elevator assembly for conveying harvested crop material to said crop processing mechanism, the elevator assembly is comprised of an elevator housing and elevator mechansim in said housing and comprising at least two fleible endless members and a plurality of slats mounted transversely to said flexible members.

wherein said slats have an S-shaped cross section.

This particular shape provides additional strength to the slats, while the reinforcing portions do not damage the harvested crop material.

According to a further aspect of the present invention there is provided a method for making slats with an S-shaped cross section, including the steps of cutting flat slats of steel plate; using a compound rolling process for providing the flat slats with an S-shaped cross section; and cutting the profiled slats to length.

This compound rolling process may equally comprise the step of providing an edge of said flat slats with notches.

BRIEF DESCRIPTION OF DRAWINGS

An agricultural harvester in accordance with the present invention will now be described in greater detail, by way of example, with reference to the accompanying drawings in which.

DETAILED DESCRIPTION OF THE PREFERRED EMBODIMENTS

The terms "grain", "straw" and "tailings" are used principally throughout this specification for convenience but it is to be understood that these terms are not intended to be limiting. Thus "grain" refers to that part of the crop material which is threshed and separated from the discardable part of the crop material which is referred to as "straw". Incompletely threshed crop material is referred to as "tailings". Also the terms "forward", "rearward", "left" and "right", when used in connection with the combine harvester and/or components thereof are usually determined with reference to the direction of forward operative travel of the combine harvester, but again, they should not be construed as limiting. The terms "longitudinal" and "transverse" are determined with reference to the fore-and-aft direction of the harvester and are equally not to be construed as limiting.

Figure 1:
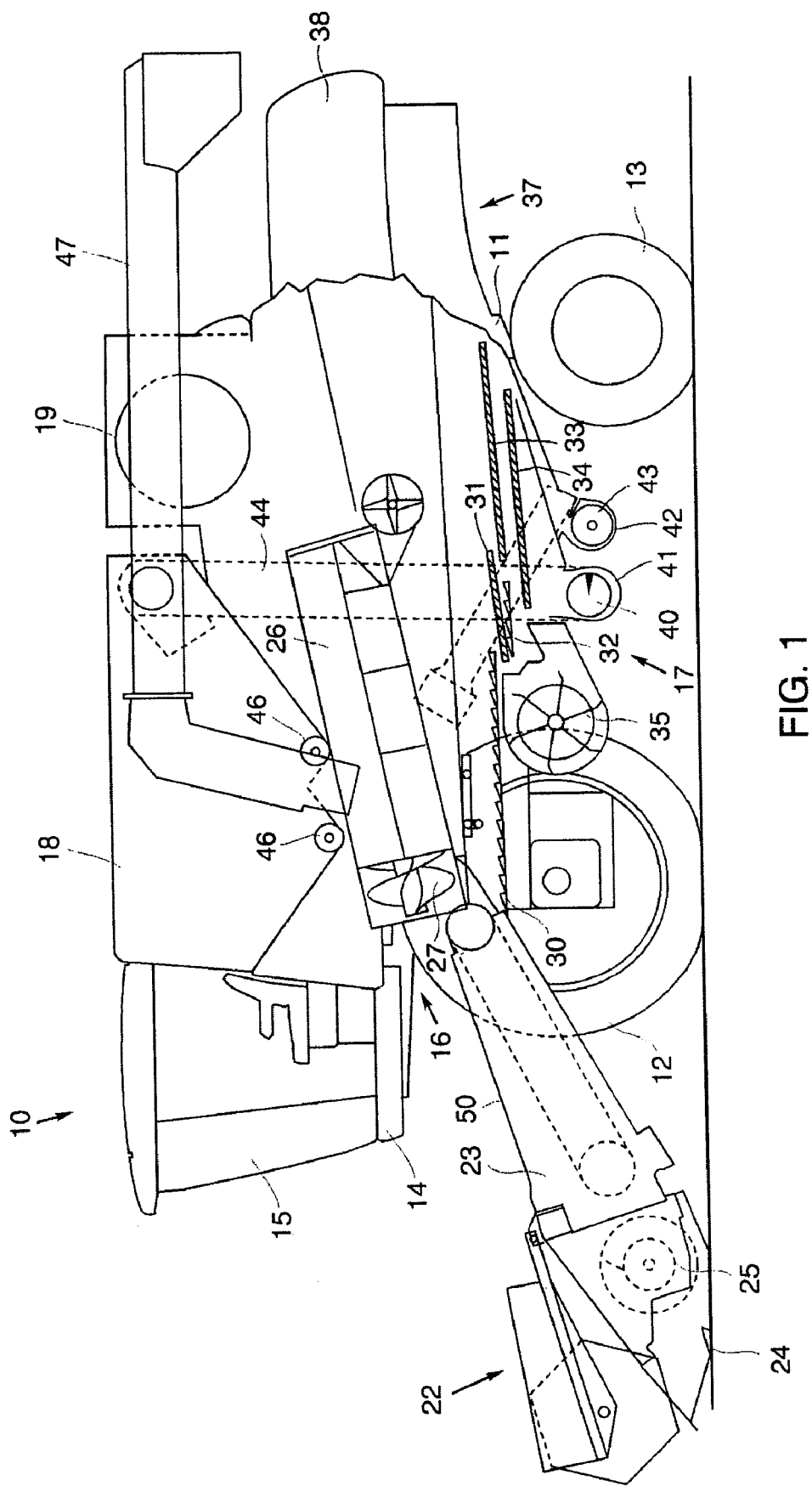
FIG. 1 is a diagrammatic, partly sectional side view of a combine harvester having a forwardly extending straw elevator.

The combine harvester 10 shown in FIG. 1 of the accompanying drawings, is of the axial-flow type, wherein crop material is threshed and separated while it is advanced by and along a longitudinally arranged rotor 27. The combine harvester comprises a chassis or main frame 11 having a pair of driven, ground-engaging front wheels 12 and a pair of smaller, steerable rear wheels 13. Supported on the main frame 11 are an operator's platform 14 with an operator's cab 15, a threshing and separating assembly 16, a grain cleaning assembly 17, a grain tank 18 and a power plant or engine 19. A conventional grain header 22 and a straw elevator assembly 23 extend forwardly of the main chassis 11 and are pivotally secured thereto for generally vertical movement which is controlled by appropriate actuators, such as hydraulic cylinders (not shown).

As the combine harvester 10 is propelled forwardly over a field with standing crop, the latter is severed from the stubble by a sickle bar 24 at the front of the header 22 and delivered by a header auger 25 to the inlet of the straw elevator assembly 23, which supplies the cut crop to the threshing and separating assembly 16.

The threshing and separating assembly 16 comprises a generally cylindrical chamber 26 in which a rotor 27 is rotated to thresh and separate the crop received therein, that is to say, the crop is rubbed and beaten between the rotors 27 and the inner surfaces of the chambers 26, whereby the grain, seed or the like, is loosened and separated from the straw.

Grain which has been separated by the threshing and separating assembly 16 falls onto a first grain pan 30 of the cleaning assembly 17 which further also comprises a pre-cleaning sieve 31, positioned above a second grain pan 32, a pair of sieves 33, 34, disposed the one above the other, and a cleaning fan 35. The grain pans 30, 32 and the sieves 31, 33, 34 are oscillated generally back-and-forth for transporting threshed and separated grain from the first grain pan 30 to the pre-cleaning sieve 31 and the second grain pan 32 and therefrom to the sieves 33, 34. The same oscillatory movement spreads said grain across said sieves 31, 33, 34, while permitting the passage of cleaned grain by gravity through the apertures of these sieves. The grain on the sieves 31, 33, 34 is subjected to a cleaning action by the fan 35 which provides an air flow through said sieves to remove chaff and other impurities such as dust from the grain by making this material airborne for discharge from the machine through an outlet 37 of the straw hood 38.

Clean grain falls to a clean grain auger 40 in a clean grain auger trough 41 and is subsequently transferred therefrom by a grain elevator 44 to the grain tank 18. Tailings fall to a tailings auger (not shown) in a tailings auger trough 42. The tailings are transported sideways by said tailings auger to a separate rethresher 43 and returned by a tailings conveyor 45 to the cleaning assembly 17 for repeated cleaning action.

A pair of grain tank augers 46 at the bottom of the grain tank 18 is used to urge the clean grain sideways to an unloading tube 47 for discharge from the combine harvester 10.

Figure 2:
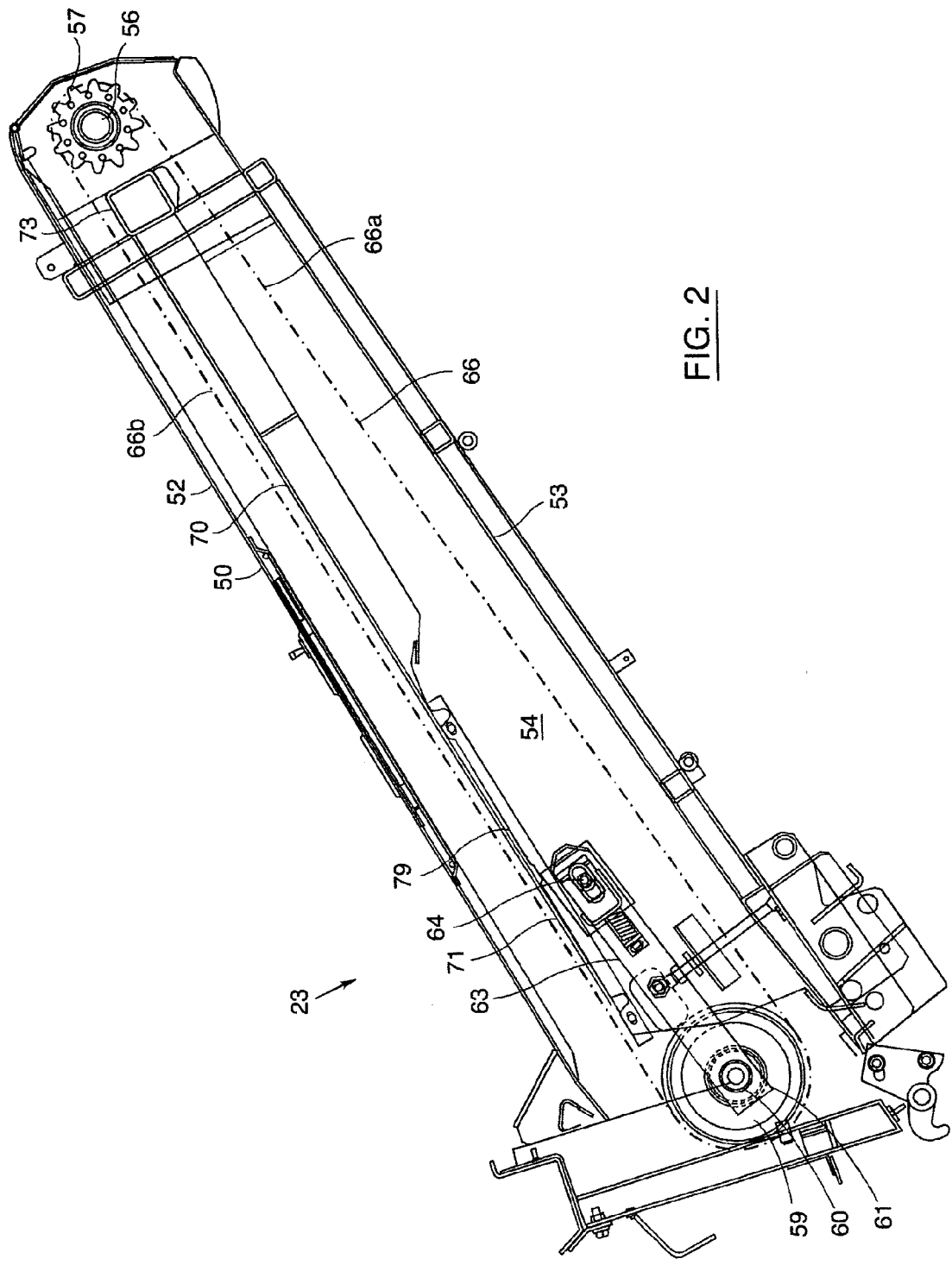
FIG. 2 is cross sectional view of the straw elevator of FIG. 1.
Figure 3:
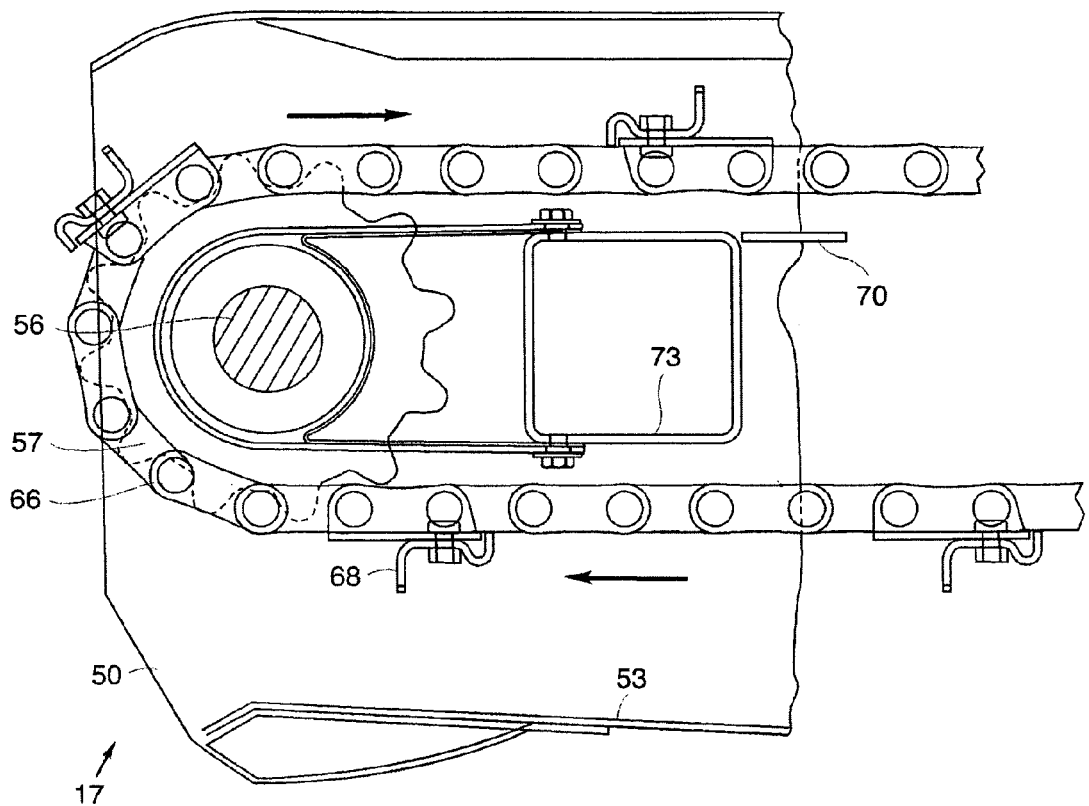
FIG. 3 is an enlarged cross sectional view of the rear end of the straw elevator.
Figure 4:
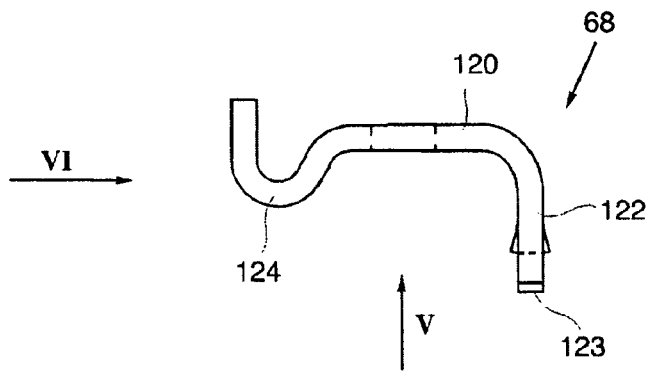
FIG. 4 is a side view of an elevator slat for use in the straw elevator of FIG. 2.
Figure 5:
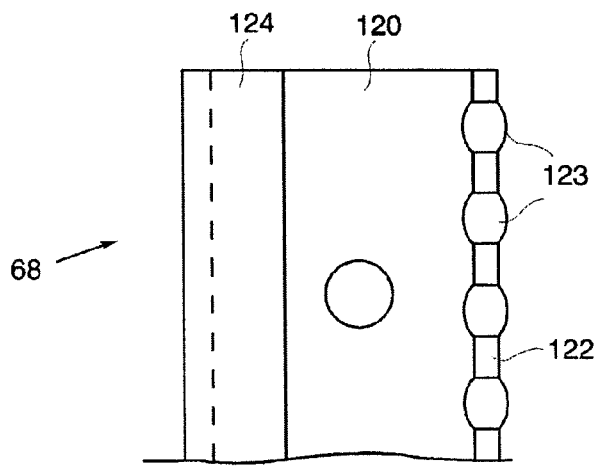
FIGS. 5 and 6 are bottom and rear views of the slat of FIG. 4, taken in the direction of arrows V and VI, respectively.
Figure 6:
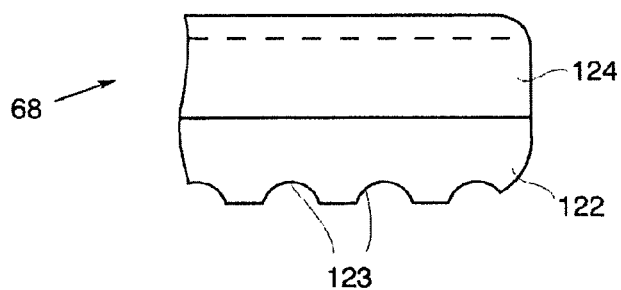

As shown in greater detail in FIG. 2, the straw elevator assembly 23 comprises a welded, substantially parallelepiped housing 50 which is pivotably secured to the main frame 11 below the operator's platform 14. The housing 50 comprises an upper wall 52 and a lower wall 53, interconnected by a pair of side walls 54. The rear end of the housing 50 is provided with a transverse drive shaft 56 which extends through the side walls 54 and is provided with a plurality of (e.g. four) sprockets 57. At the front end of the elevator assembly 23, a drum 59 is installed for rotation between the side walls 54. The drum has a front shaft 60 extending through apertures in the side walls and received in bearings 61 which are mounted to pivot arms 63. At their rear ends these arms 63 are pivotably affixed to the outside of the side walls 54 at pivots 64.

The elevator assembly 23 includes elevator mechanism comprising a plurality of endless, flexible members, e.g. chains 66, which are trained along parallel paths over the sprockets 57 and the front drum 59. The chains are driven by the sprockets 57 on the drive shaft 56. Mounted across and to the chains is a plurality of generally transverse slats 68 which will be described in further detail hereinafter.

The lower wall 53 of the housing 50 may be provided with a wear plate along which the lower run 66a of the elevator mechanism conveys the harvested crop to the inlet of the threshing and separating assembly 16. During operation of the elevator assembly 23, the drive shaft 56 is rotated CCW as seen in FIG. 2 to make the slats 68 adjacent the front drum 59 engage and grab the crop material which is delivered thereto by the header auger 25. The slats of the lower run 66a convey the crop rearwardly and upwardly along the lower wall 53 or the wear plate, if present, to the outlet of housing 50, where the crop is combed away from the elevator mechanism by the front portion of the threshing rotor 27.

In order to prevent that stray material that was not removed immediately from the elevator mechanism, falls back from the upper run 66b onto the lower run 66a and starts wrapping around the drive shaft 56 or accumulating around the sprockets 57, an intermediary shielding mechanism is provided between the lower and upper runs 66a, 66b of the elevator mechanism. In the present embodiment, the shielding mechanism consists of a stationary rear plate 70 and a removable front plate 71. The rear plate 70 is welded between and to the side walls 54 and to a transverse tubular reinforcement 73 disposed near the drive sprockets 57. The front plate 71 extends forwardly from the front edge of the rear plate 70 towards the front drum 59 and is attached by bolt mechanism 75 to the side walls 54 of the housing 50.

As illustrated in FIGS. 3 to 6 the elevator slats 68 are made out of a generally S-shaped profiles. They have a substantially flat middle portion 120 provided with holes for attaching the slats 68 to the chains 66. The front portion 122 is substantially perpendicular to this middle portion and has a lower edge which is provided with notches 123. During conveyor operation the front portion 122 engages the harvested crop material, while its lower edge moves adjacent to or slides over the lower housing wall 53. The notches 123 may be applied to the profile by a continuous rolling operation.

The rear portion 124 extends from the middle portion 120 and has an upwardly curved cross section. The part adjacent the middle portion may be bent downwardly, but the outer edge faces upwardly. This rear portion provides additional strength to the whole slat 68, such that the distance between the parallel chains 66 and the corresponding length of the slats 68 can be extended without making the slats prone to distortion during harvesting operations.

As the chains 66 follow a curved path around the sprockets 57, the slats 68 attached thereto are equally rotated. In this area the rear portion 124 momentarily moves downwardly to the lower wall 53 and is forced into the conveyed crop. The edge of the rear portion 124 is directed away from the normal crop flow such that it does not damage the crop material. For instance, this arrangement prevents additional cuts in the kernels when corn ears are transported.

The slats 68 are made out of flat steel material to which the S-shaped profile is provided in a compound, continuous rolling operation. The S-shaped cross section has first and second surfaces 125 and 126, respectively, interconnected by first and second edges 127 and 128, respectively, along sides of the slat. This rolling operation may also include the addition of notches 123 to the front portion 122 alone the first edge 127. The notches 123 extend inwardly from the first edge 127 of the slat into the first and second surfaces 125 and 126.

Although the present invention has been described with reference to a particular machine and structure, other embodiments can be thought of without departing however from the scope of the invention as defined in the claims. For instance it is conceivable to provide the rear portion 124 with a forwardly curved profile.

The invention claimed is:

1. A method of making slats in an agricultural harvesting machine, including the steps of:
    cutting flat slats of steel plate;
    using a compound rolling process for providing the flat slats with a profiled S-shaped cross section, each slat having first and second surfaces interconnected by first and second edges along sides of the slat;
    cutting the profiled slats to length; and
    providing a plurality of spaced notches in the first edge of the slat, each notch extending inwardly from the first edge of the slat into the first and second surface.

2. The method of claim 1 wherein each notch has a semi-circular configuration.

3. The method of claim 1 wherein each notch is defined by a sidewall, each sidewall having a first edge intersecting the first surface of the slat and a second edge intersecting the second surface of the slat.

4. The method of claim 3 wherein at least one sidewall is generally accurate.

* * * * *